March 27, 1945. B. G. CARLSON 2,372,184
HOMING AUTO PILOT FOR AIRCRAFT
Filed July 19, 1935 4 Sheets-Sheet 1

INVENTOR
BERT G. CARLSON
BY
HIS ATTORNEY.

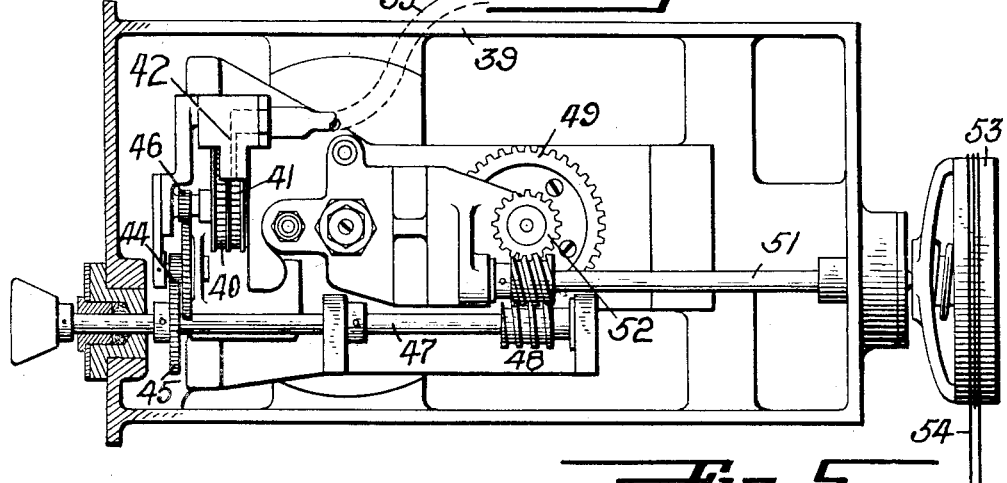
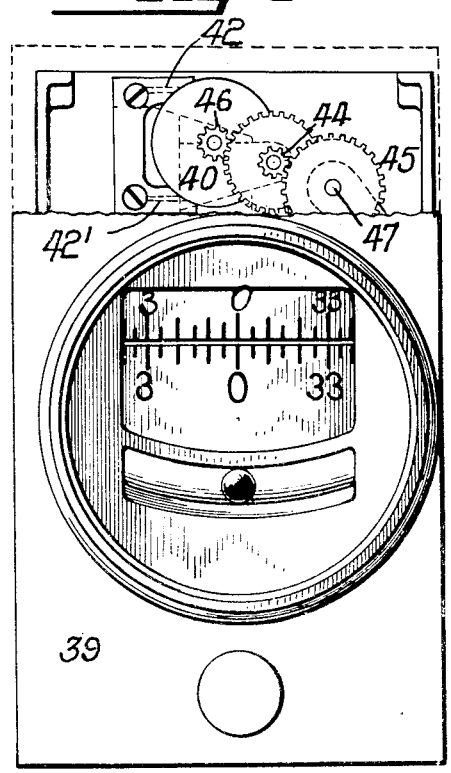
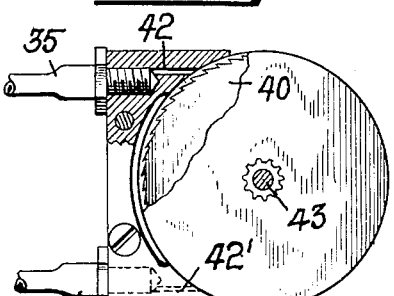
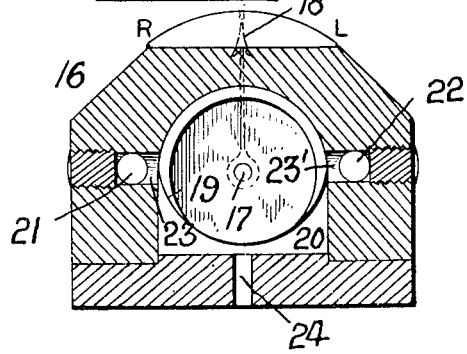

March 27, 1945.  B. G. CARLSON  2,372,184
HOMING AUTO PILOT FOR AIRCRAFT
Filed July 19, 1935  4 Sheets-Sheet 3
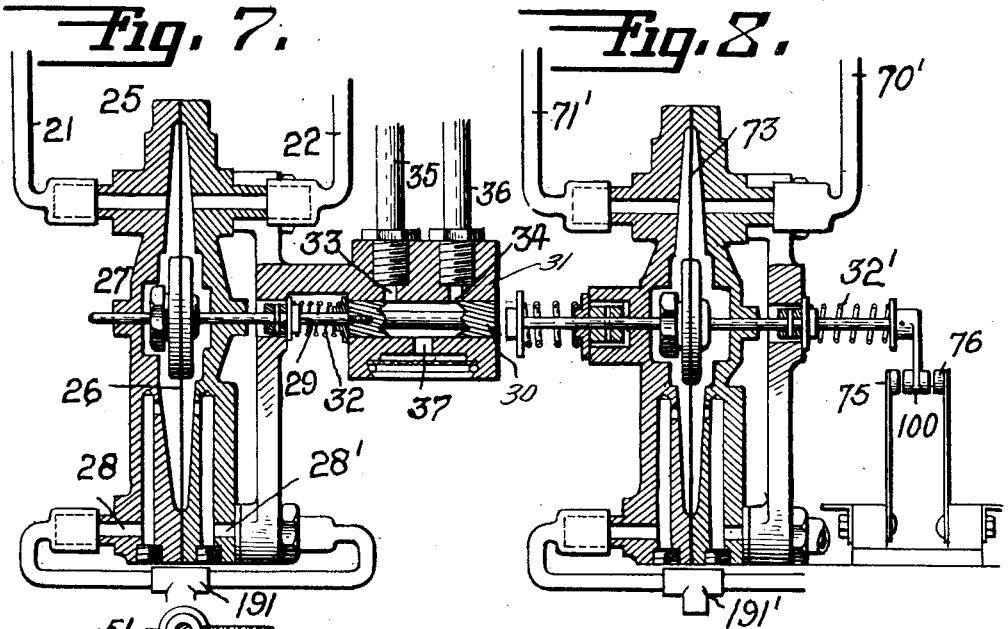
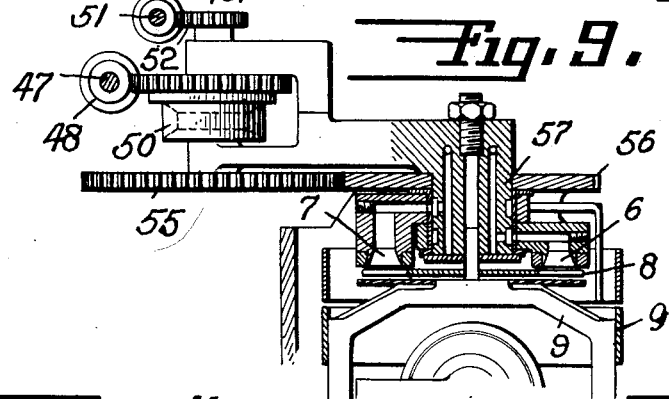
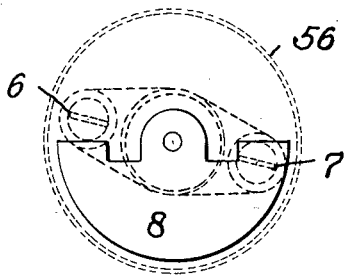
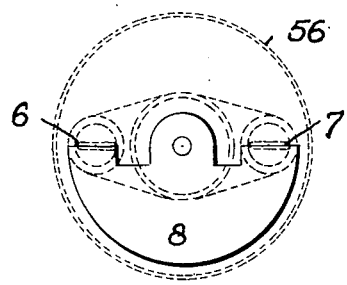
INVENTOR
BERT G. CARLSON
BY Herbert H. Thompson
HIS ATTORNEY.

March 27, 1945.                B. G. CARLSON                2,372,184
                        HOMING AUTO PILOT FOR AIRCRAFT
                        Filed July 19, 1935         4 Sheets-Sheet 4

INVENTOR
BERT G. CARLSON
BY
Herbert H. Thompson
HIS ATTORNEY.

Patented Mar. 27, 1945

2,372,184

UNITED STATES PATENT OFFICE 2,372,184

HOMING AUTOPILOT FOR AIRCRAFT

Bert G. Carlson, Bellerose, N. Y., assignor to Sperry Gyroscope Company, Inc., Brooklyn, N. Y., a corporation of New York Application July 19, 1935, Serial No. 32,193

27 Claims. (Cl. 172—282)

This invention relates to a complete system for automatic flying, especially designed for use to supplement the human pilot, and which not only is capable of maintaining the ship on a predetermined compass course and stabilizing the same in flight, but which also will automatically fly the ship towards any predetermined radio sending station or along a radio beam and which will bring the aircraft down automatically at the airport along a radio landing beam. The device therefore will land a craft in fog when the aviator is unable to do so. The invention is to be distinguished, however, from a wireless or radio controlled pilotless craft or aerial torpedo, in which signals are transmitted from the ground which cause the craft to maneuver as desired in the air.

Another feature of the invention is to improve blind landing aids for aircraft, especially automatic blind landing equipment which operates through or in conjunction with an automatic pilot on the craft.

Other features of the invention are developed in the ensuing description which is intended as exemplary of the novel principles involved.

Referring to the drawings illustrating one form my invention may assume,

Fig. 3 is a plan view of the primary directional gyroscope employed as the course maintaining device.

Fig. 4 is a front elevation, partly in section, of the same.

Fig. 5 is a detail, partly in section, of the air motor for changing the course through the directional gyroscope.

Fig. 6 is a vertical section through the radio course indicator which is used to alter the course set by the directional gyroscope.

Fig. 7 is a sectional detail of the relay valve controlled thereby, placed between the same and the directional gyroscope.

Fig. 8 is a similar view of the relay between the first mentioned directional gyroscope and the directional radio loop.

Fig. 9 is a vertical section through the primary directional gyroscope, taken at right angles to Fig. 4.

Fig. 10 is a detail of air pick-off or differential control device used on the gyroscopes.

Fig. 11 is the same, with the parts in a different position.

Figures 1, 2:
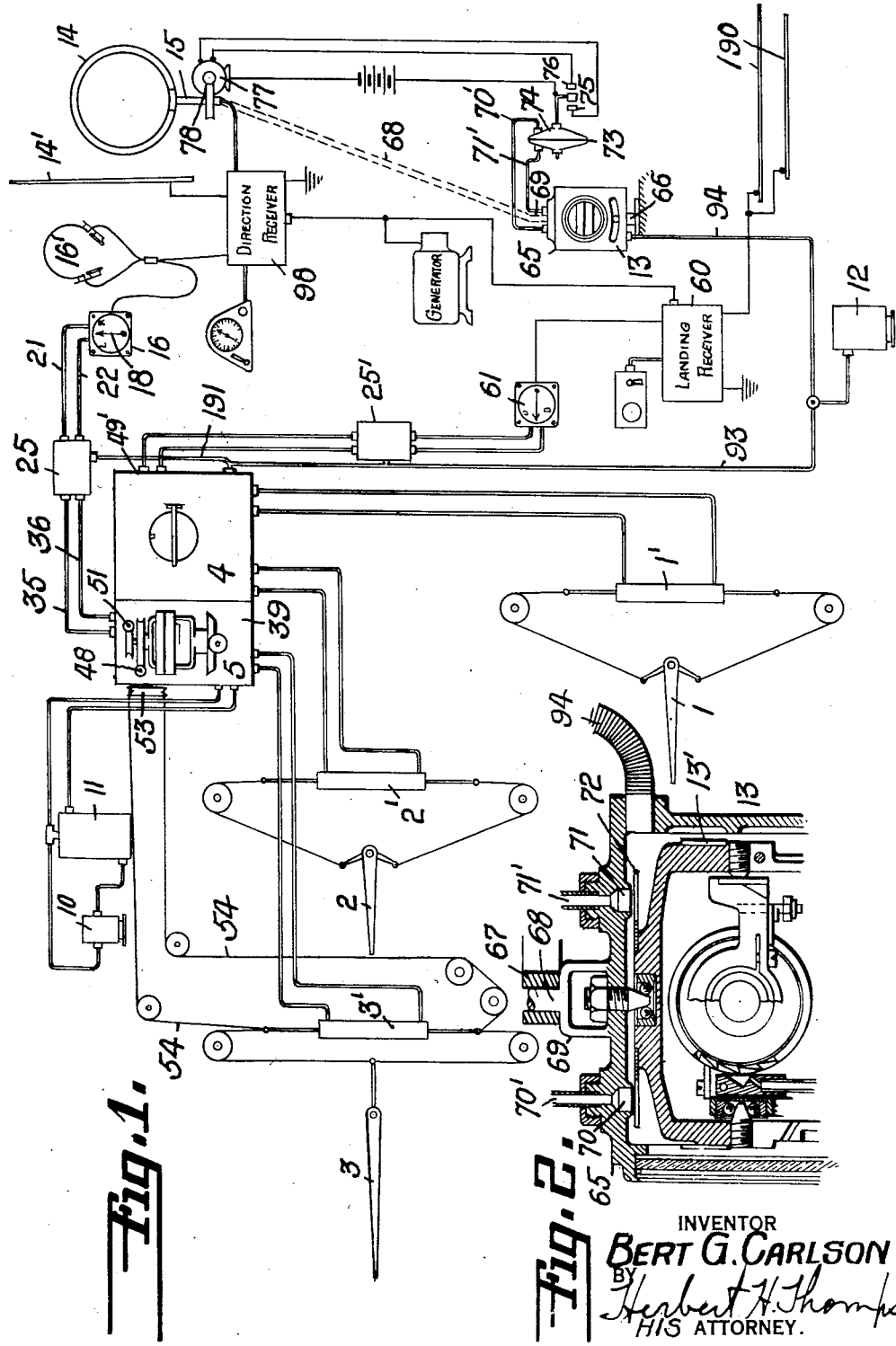
Fig. 1 is a diagram showing the relation between the several parts or units of my invention.
Fig. 2 is a sectional detail of the upper portion of the directional gyroscope employed as part of the drift correcting means.

While my invention may be applied to a variety of types of automatic pilot for aircraft, I have shown it applied to an automatic gyro-pilot of the hydro-pneumatic type disclosed in my prior patent, joint with Elmer A. Sperry, Jr. and Mortimer F. Bates, No. 1,992,970, dated March 5, 1935. According to this system, the three control planes or rudders, i. e., the elevator 1, ailerons 2 and vertical rudder 3, are controlled from a plurality of gyroscopes, i. e., a gyroscopic horizon or gyrovertical 4 governing control surfaces 1 and 2, and a directional gyroscope or other direction maintaining means or compass 5 governing the vertical rudder. The pick-off or positional control from the gyroscopes in each instance is by means of a pair of opposed air ports, shown at 6 and 7 in the case of the directional gyroscope (Figs. 9, 10 and 11) which are differentially covered and uncovered by semicircular cut-off plate 8 on the vertical ring 9 of the gyroscope. Similar ports 86 and 86' and 87 and 87' and plates 88 and 89 (Fig. 12) are provided about each of the two horizontal axes 90 and 91 of the gyroscopic horizon 4. The differential air pressure in each case actuates, through relays (not shown), the respective hydraulic servo motors 1', 2' and 3' which control the respective control surfaces 1, 2 and 3.

Oil pressure is shown as supplied to the system by oil pump 10, through reducing valve 11, while air pressure, either positive or negative, is supplied by the air pump 12, which is preferably a vacuum pump which exhausts the air from the casings of both gyroscopes through pipe 93, and from relays 25 and 25' (hereinafter described), and also through pipe 94 from the casing of a drift gyroscope 13 used in connection with applicant's novel system of setting up a straight ground course towards the destination.

For supplementing the straight automatic pilot system, I employ a directional radio device or devices to enable the craft to maintain a set course towards any predetermined radio sending station or beacon and to land at any predetermined landing field having a landing radio beacon. To this end, the plane is shown as equipped with a radio energy collecting means in the form of a directional loop 14 or directive antenna which is normally fixed fore and aft on the craft, but which is rotatably adjustable on a vertical shaft 15, and a non-directive antenna 14'. A landing antenna 190 is also preferably provided. From antennae 14 and 14' any suitable form of radio direction indicator or homing device 16 may be actuated through a suitable receiving circuit 98, so that by observing the device the aviator may himself change the adjustment of the directional gyroscope to cause the aircraft to fly towards the indicated destination. Such homing devices are known in the art and usually employ a polarized indicator in which the indication varies with the phase relationship of the signals received from the two antennae. Binaural head phones 16' are also used to some extent.

Preferably, however, I provide an automatic means for causing the craft to fly towards the radio sending station, for which purpose I provide some means for altering the course of the craft through the servo motor of the automatic pilot in response to signals which are a measure of the angle made by a straight line to the transmitting station and a line originally set toward said station but held fixed in azimuth, and which are preferably generated in the loops 14 and 14'. To this end, the shaft 17 of an indicating pointer 18 of instrument 16 (Fig. 6) is shown as provided with a suitable non-coercive pick-off device which may be of the differential air-flow type similar in principle to the above described pick-off 6, 7 and 8. As shown, shaft 17 has connected thereto a cam shaped disc 19 which turns within a chamber 20, from which air is continually exhausted through a pair of pipes 21 and 22 which connect with the ports 23 and 23' leading into chamber 20. Normally, said ports are equally covered by said disc, but if the disc is displaced in either direction, one port is covered more than the other, resulting in a differential air flow through the pipes, the air entering through a small bleeder hole 24 to reduce air flow through the pick-off. To further reduce the velocity of air flow therethrough, the differential pressure in said pipes is preferably led into a relay 25, shown in detail in Fig. 7, from which air is exhausted by pump 12 through pipe 191. It is obvious that this relay may be omitted and ports 21 and 22 directly connected to the servo motor if a suitably designed pick-off is employed.

The air pressure from pipes 21 and 22 is transmitted to opposite sides of a piston or flexible diaphragm 26, which divides into two parts the interior space within the housing 27. Air is continuously withdrawn from both sides of the diaphragm through apertures 28 and 28' connected to the common exhaust pipe 191 leading to the pump. When the pressure drop in the pipes 21 and 22 varies, the diaphragm will move to the right or left, carrying with it the stem 29 secured thereto and moving the slide valve 30 within the valve housing 31. The diaphragm is normally centralized by spring 32. Slide valve 30 normally equally covers ports 33 and 34 connected with pipes 35 and 36 leading to the directional gyroscope. Since air is continually exhausted from the casing of said gyroscope, air at atmospheric pressure will be drawn through the common port 37 in the valve housing 31 to pass differentially through pipes 35 and 36, the amount passing through each varying in accordance with the position of the slide valve.

Air from said pipes operates a reversible servo motor within the directional gyroscope housing 39 (Fig. 3). Said motor is shown as in the form of a pair of notched discs or turbo-rotors 40 and 41 having teeth or vanes thereon which face in opposite directions. One pipe 35 supplies air to a nozzle 42 to drive one rotor 40 in one direction, while the other pipe 36 supplies air through nozzle 42' to drive the other rotor in the opposite direction. Both rotors are mounted on a common shaft 43 which is consequently stationary if the jets are equal in pressure, but which will revolve in the direction determined by the nozzle discharging the preponderant air pressure.

Rotation of said shaft is utilized to change the course through the gyroscope by turning the control or pick-off device with respect thereto, which is readily accomplished by varying the relationship of the rudder and gyroscope through a differential in the follow-up connections. To this end, the shaft 43 is shown as driving double reduction gearing 44, 45 through a pinion 46, the last gear of said train being mounted on a shaft 47 which turns a worm 48. The latter is shown as driving a worm wheel 49 forming one arm of a differential gear train 50 (Fig. 9). Another arm of said train is turned from a worm shaft 51 through worm wheel 52, by means of which the follow-up connection from the rudder servo motor 3' is provided by a cable drum 53 mounted on the shaft 51 and connected by cables 54 to the servo motor. It will be understood that similar follow-up cables are provided for both axes of the horizon gyroscope 4. These are omitted for the sake of simplifying the diagram in Fig. 1. The third arm of the differential drives the large gear 55 which turns the gear 56 at the top of the directional gyroscope. To said gear 56 is secured a sleeve 57 on which is mounted the pick-off jets 6 and 7 above referred to, and which cooperate with the cut-off semi-circular plate on the vertical ring 9 of the directional gyroscope to control the rudder through the servo motor system. It will readily be seen, therefore, that a change of direction of the radio loop will change the relation between the gyroscope and follow-up system to cause a change in the heading of the craft.

Figure 12:
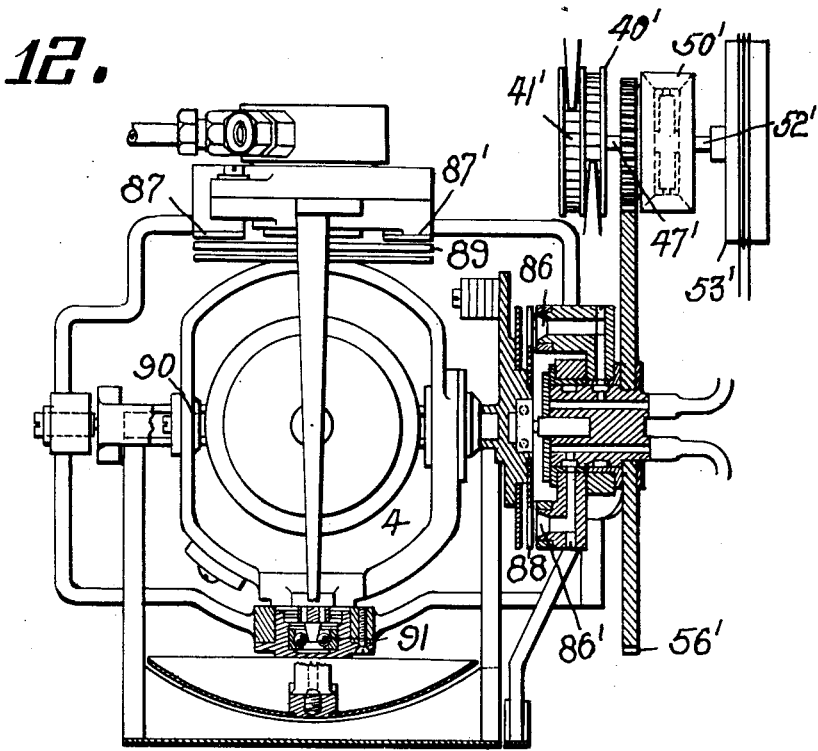
Fig. 12 is a plan view, partly in section, of the horizon gyroscope.

For causing the descent of the craft or automatic landing of the craft at a landing field, I have represented a landing beacon receiver at 60, operated from landing antennae 199 designed to be used with inclined radio landing beams and which may control an indicator 61 indicating up and down, as known in the art. Said indicator may also have a pick-off device, such as shown in Fig. 6 or Fig. 9, so as to control the setting of the pick-off nozzles at the horizon gyroscope about a transverse axis through a relay 25', in a manner similar to that described in connection with the control of the directional gyroscope from radio direction indicator 16. Thus, as shown in Fig. 12, a similar system of turbines 40' and 41' may be used to drive a shaft 47' to turn one arm of differential 50', while the follow-up is brought in through drum 53' and shaft 52', the third arm turning large gear 56'. Consequently the landing beacon will cause the aircraft to climb or dive in accordance with angular elevation of the signals received by altering the relationship between the gyroscope and the controls therefrom. It will be understood that multiple reduction gearing is preferably employed between the turbine wheels and the ported control member 86—86', as in Fig. 3, so that course changes are made slowly and the weak torques of the turbines multiplied.

Figure 13:
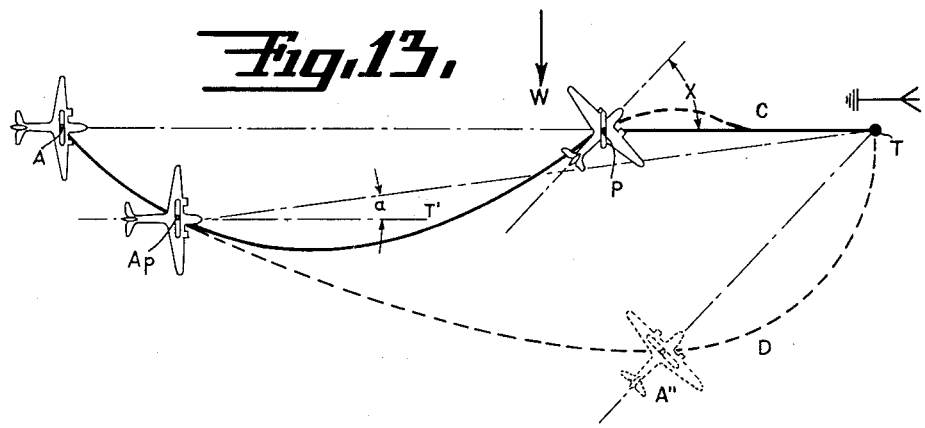
Fig. 13 is a diagram illustrating the advantages of my invention.

While the system so far described would operate satisfactorily and bring an aircraft to its destination, it would not be by the shortest path in case a side wind were blowing and the airplane were flying toward an ordinary broadcasting station as distinguished from flying along directional beams. This condition is represented in Fig. 13, where T is the sending station, A the aircraft, and W a side wind. In order to cause the craft to fly directly towards its destination by a straight ground track regardless of side wind, I have provided an additional directional device to detect side drift, which may be in the form of a gyroscope 13 mounted for freedom about a vertical axis and which operates to position the loop about its vertical axis in such a position that the craft flies a straight course C towards the destination. The gyroscope 13, while similar to the directional gyroscope 5 of the gyro-pilot, has its outer casing 65 rotatably mounted on upper and lower guide bearings 66 and 67 (Figs. 1 and 2) and means are provided for turning said casing in accordance with the turning of the loop 14 on the craft, and at the same time for turning the loop as long as said casing is displaced from its proper position with respect to said gyroscope. Dotted lines 68 connecting the shaft 15 and the stub shaft 69 forming the upper bearing for the casing 65, represent the drive from the loop to said casing. The said casing carries at its top differential air ports 70 and 71 (Fig. 2) which are similar to the differential ports described above, and the gyroscope carries a similar semicircular cut-off disc 72. When said casing and gyroscope occupy their normal centralized positions, air is withdrawn equally through the pipes 70' and 71' connected to said ports, by reason of the continual withdrawal of air from the gyro casing, but the pressure balance is disturbed whenever the casing turns with respect to the gyroscope, which is primarily due to the turning of the craft from a straight course, which in turn is due to side drift. The differential pressure is transmitted to the opposite sides of a diaphragm 73 within a container 74 provided with a small leak on each side of the diaphragm through pipe 191', so that the diaphragm will be moved back and forth in accordance with which way the casing is turned with respect to the gyroscope. The movement of the diaphragm completes a contact between one or the other of contacts 75, 76 and moving contact 100 to operate a servo motor 77 which turns the loop 14 through worm gearing 78 in the opposite direction to that in which the aircraft is turning and of like amount as it operates to restore synchronism between the gyro casing and gyroscope.

It will of course be understood that the anti-drift gyro 13 and its follow-up mechanism, including motor 77, need not be used if the side drift is negligible, in which case the loop 14 remains fixed on the craft and the craft's heading is maintained directly toward the sending station. In case side drift is suspected, the gyroscope within box 13 is first oriented by hand by any suitable caging device such as common in the prior art, as shown in my prior Patent #2,061,894, dated November 24, 1936, until the cut-off plate 72 thereon is synchronized with the ports 70 and 71, which may readily be done by synchronizing the reading of the card 13' on said gyroscope with the main card 9' on the directional gyroscope 9 (Fig. 9). After this is done, the circuit energizing servo motor 77 is energized and the anti-drift mechanism brought into operation. A similar procedure is necessary where an aviator desires to change the sending station toward which he desires to fly, the gyro being temporarily caged until the loop and craft are directed toward the new station.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Referring now to Fig. 13 to explain the operation of the device in the presence of side wind W, it should be remembered that the loop is held fixed in azimuth in the position in which the gyro 13 is originally set. Starting at position A, the craft will soon find itself at an intermediate position $A_p$ at which the aircraft has been blown off the course AT but before the automatic drift mechanism has operated. At this point it will be seen that although the sending station is along the line $A_pT$, the loop will be pointed in the direction of the line $A_pT'$ parallel to AT, by reason of its being held fixed in azimuth by the gyro 13. Under these conditions a signal is generated in the loop proportional to the angle $a$, or in other words, proportional to the angle between the direct line to the transmitting station and the azimuth line maintained by the gyroscope, which represents the original bearing line of the station T when the gyro 13 is released. In response to the signal thus generated, the turbine motor, through its reduction gears will gradually alter the original setting of the direction gyroscope. Consequently, the craft will very slowly be turned in a counterclockwise direction so that its heading makes an angle $x$ with the original heading, or in other words, so the craft is crabbing into wind at angle $x$ from its original heading. This angle $x$, however, will tend to increase although the rate of increase will become slower and slower as the signal decreases in the loop, or in other words, as the straight ground track AT is approached. At the point P, where the craft reaches the original ground track course, the signal in the loop will disappear and the craft will maintain this drift-free straight ground track course if the angle $x$ is the proper drift angle. If, however, the angle is too great, the craft will cross this line, as indicated by the dotted extension of curve C, and an opposite signal will be received by the loop, resulting in a decrease in the drift angle, and the process will be repeated until the straight ground track is followed. The dotted curve D represents the path the craft would pursue if the anti-side-drift gyro were not employed and the loop remained fixed on the craft.

Having described my invention, what I claim and desire to secure by Letters Patent is:

1. In a system for guiding aircraft toward a radio transmitting station, the combination with the rudder of the craft and a servo motor for turning the same, of a gyroscope connected for controlling said servo motor to maintain the craft on any predetermined course, a radio compass loop normally fixed but rotatably adjustable on said craft, and means controlled from and responsive to turning of said loop away from a position normal to the transmitting station due to drift of the craft for altering the craft's heading by changing the base line of said gyroscope, but leaving the gyroscope in control of said servo motor to thereby direct the craft toward said sending station, whereby the heading is adjusted until said loop remains fixed on the craft and directed toward the transmitting station.

2. In a system for guiding aircraft toward a radio broadcasting station, a directional gyroscope by which a course may be set and maintained, directional radio means on the craft responsive to the direction of a transmitting station, and base line means at said gyroscope and controlled by said radio means for altering the relation between the gyroscope and the rudder without disturbing the position of the gyroscope or interrupting its control of the rudder to correct the course steered from the gyroscope.

3. In a system for the blind landing of aircraft, a gyroscope for maintaining normally level flight, a control surface actuated therefrom, a landing beam radio receiver, and means actuated by said receiver for automatically altering the relation between the gyroscope and said control surface while leaving said gyroscope in control of said craft, to cause descent at a gliding angle determined by the landing beam.

4. Automatic steering gear for aircraft having a direction maintaining device, means controlled thereby for maintaining a uniform heading, a directive antenna, means controlled thereby for altering the relation between said device and craft to maintain the craft in a fixed position in azimuth with respect to the radio sending station, a directional gyroscope for detecting turning of the craft, and means actuated therefrom for displacing said antenna with respect to the craft until a straight ground track toward the sending station is set up regardless of side winds.

5. In combination with a dirigible aircraft, a directive antenna on said craft for aligning the craft with the sending station, directional means on said craft for maintaining a predetermined heading, means for correcting the latter heading from the antenna, including an air operated servo motor at said directional means, a course indicator operated by the output of said antenna, and differential air ports controlled by said course indicator for controlling said servo motor, and means whereby the consequent turning of the craft causes a readjustment of said antenna to introduce a drift correction in the heading to set up a straight ground track toward the sending station.

6. In a combined radio-automatic pilot for aircraft, a radio compass loop rotatably mounted on the craft, steering means for turning the rudder controlled from said loop, a directional gyroscope, a follow-up frame therefor, and means responsive to relative displacement of said frame and gyroscope for both turning said frame to follow said gyroscope and for turning said loop.

7. A radio-automatic pilot for aircraft as claimed in claim 6, wherein said means turns said loop through an angle substantially equal and opposite to the angle through which the craft is turning.

8. In a means for directing an automatically steered aircraft toward its objective by a straight course under side wind conditions, a directive antenna rotatably mounted on the craft and adapted to be maintained in line with the objective sending station, direction maintaining means on the craft adapted to maintain a fixed position in azimuth and arranged for automatically steering the craft, means actuated as a result of the turning of said antenna with respect to said objective for causing said means to effect turning of the craft into the wind, and means responsive to such turning causing opposite turning of the antenna on the craft until said antenna stops turning with respect to its objective when the straight ground track is reached.

9. In a homing autopilot for aircraft having a directional control rudder, a servo motor for operating said rudder, a direction maintaining or compass device connected for controlling said servo motor so as to hold the aircraft on a set heading, radio means including a directional antenna on the craft, the output of which is responsive to the relative direction of received electromagnetic radiations from a transmitting station, and means controlled by any change in the null output of said loop for both shifting the base line maintained by said compass device with respect to said rudder, in the event of side drift of the craft, and for turning the loop an equal amount in the opposite direction, to thereby cause said compass device to change the craft's heading so as to maintain a straight ground track toward said station.

10. In a homing autopilot for aircraft having a directional control member and an elevational control member, servo motors for operating said members, gyroscopic means connected for controlling said servo motors so as to hold the aircraft on a desired heading in azimuth and attitude in elevation, and radio means on the craft operating in response to electromagnetic radiation, a part of said radio means being connected for shifting the base line maintained by said gyroscopic means with respect to said directional control member to effect necessary changes in the craft's heading to keep the craft headed toward the desired destination, and another part of said radio means being connected for shifting the base line maintained by said gyroscopic means with respect to said elevational control member to cause the craft to glide down a landing beam for landing at the desired destination.

11. In a gyro pilot with homing radio control, a directional antenna, a course maintaining gyroscope, a servo motor for altering the course steered by said gyroscope, a radio compass indicator responsive to the electrical output of said antenna and showing left and right deviations from course, and a differential air flow pick-off device for said indicator for causing said servo motor to operate in the proper direction to keep the craft headed toward a selected radio transmitting station.

12. In a gyro pilot with homing and automatic landing radio control, a directional antenna, a course maintaining gyroscope, a servo motor for altering the course steered by said gyroscope, a radio compass indicator responsive to the electrical output of said antenna, a landing beam antenna, a gyro-vertical for maintaining level flight, a servo motor for altering the attitude through said gyro-vertical, an up-down radio indicator responsive to the output of said landing receiver, and pick-off devices for each of said indicators for operating each servo motor in the proper direction to keep the craft headed toward a selected radio transmitting station and to bring it down along the landing beam.

13. In a means for directing an automatically steered aircraft toward its objective by a straight course under side wind conditions, a directive antenna rotatably mounted on the craft and adapted to be maintained in line with the objective sending station, direction maintaining means on the craft adapted to maintain a fixed position in azimuth and arranged for automatically steering the craft, means actuated as a result of the turning of said antenna with respect to said objective for causing said means to effect turning of the craft into the wind, a directional gyroscope, and means controlled thereby tending to hold said loop fixed in azimuth whereby said craft will be turned and said loop adjusted until a straight ground track is reached.

14. In a homing autopilot for aircraft having a direction controlling rudder, a servo motor for operating said rudder, a direction maintaining automatic steering device connected for controlling said servo motor so as to hold the aircraft on a set heading, and radio means including a directional antenna on the craft, the output of which is responsive to the direction of received electromagnetic radiations from a transmitting station, a left right meter actuated by said output, an air flow pick off device connected to said meter, and a reversible air turbine operated thereby and connected to said automatic steering device to change the course of the craft to keep it flying toward the selected transmitting station.

15. In combination with a navigable vehicle, an energy collecting means having a normal angular relation to a source of radiant energy and to the longitudinal axis of the vehicle, means for automatically keeping the vehicle in a set heading, radio receiving means for adjusting said heading to maintain said collecting means in normal relation to said source of energy, and pneumatic means subject to changes in heading to cause relative displacement of the collecting means from its normal relation to the axis of said vehicle in order that said collecting means may retain its normal relation to said source.

16. In apparatus of the class described, a vehicle, an energy collecting means having directional characteristics being positioned in a normal angular relation to a source of energy, a radio compass associated therewith, an automatic pilot for maintaining a constant heading of said vehicle, a radio compass indicator having means associated therewith for controlling and altering the heading of the vehicle to agree with course indications, and means responsive to changes in heading for rotating said energy collector in order to maintain the angular relation between said collector and said energy source constant.

17. In apparatus of the class described, a vehicle, a radio compass including an energy collecting means having directional characteristics positioned in a normal angular relation to a source of energy, an automatic pilot for maintaining a constant heading of said vehicle, a radio compass indicator having means associated therewith for controlling and altering the heading of the vehicle to agree with course indications, and means for rotating said energy collector when the heading of the vehicle is changed in order to maintain the angular relation between said collector and said energy source constant.

18. In a system for guiding aircraft toward a radio transmitting station and for bringing the craft down upon a landing field having a radio landing beam, the combination with azimuth and elevation surfaces of the craft and servo motors for turning the same, apparatus for controlling said servo motors to automatically maintain the craft on any predetermined course in uniform level flight, directional radio responsive means on the craft for correcting the course maintained by said apparatus to direct the course toward the transmitting station, and radio means responsive to said landing beam for altering said level flight apparatus to cause descent at the landing field along said landing beam.

19. Automatic steering gear for aircraft having a directive radio antenna for receiving signals from a radio transmitting station, a direction maintaining device and automatic means actuated by the latter for holding the craft on a predetermined heading, means responsive to the position of said antenna with respect to the sending station for changing the heading of the craft through said automatic means, means for detecting such change in heading of the craft, and means controlled thereby for oppositely turning said antenna with respect to the craft, whereby a drift angle is set up such that a straight ground course to the radio transmitter is secured.

20. Automatic steering gear for aircraft having a directive radio antenna for receiving signals from a radio transmitter station, a direction maintaining device and automatic means actuated by the latter for holding the craft on a predetermined heading, means responsive to the position of said antenna with respect to the sending station for changing the heading of the craft through altering the base line of said device, means for detecting such changes in the heading of the craft, and motor means controlled thereby for turning said antenna with respect to the craft in a direction opposite to that in which the craft is turning and of like amount, whereby a drift angle is set up and a straight ground course to the radio transmitter secured.

21. Automatic steering gear for aircraft having a directive radio antenna for receiving signals from a radio transmitter station, a direction maintaining device and automatic means actuated by the latter for holding the craft on a predetermined heading, means responsive to the position of said antenna with respect to the sending station for changing said heading of the craft to cause the same to fly toward the sending station, a drift gyroscope, a follow-up system therefor, and means actuated therefrom for turning said antenna oppositely to the turn of the aircraft to maintain said antenna fixed in azimuth.

22. In a radio homing autopilot for aircraft, a gyro pilot for normally maintaining a predetermined heading of the craft, an automatic radio compass mounted on the craft and adapted to be tuned to a transmitting station and including a directive loop mounted for orientation on the craft, a directional gyroscope mounted on said craft for freedom about a vertical axis, said gyro pilot including a servo motor for operating the rudder of said craft, and signal generating means responsive to the difference in bearing of said radio transmitter as determined by the loop and the azimuth position maintained by said gyroscope for altering the heading of said craft through said gyro pilot to steer the craft in straight line movement toward the sending station.

23. In a homing automatic pilot for aircraft, a gyro pilot for normally maintaining a predetermined heading of the craft, a radio receiver on said craft adapted to be tuned to the frequency of a transmitting station and including a directional antenna rotatably mounted about a normally vertical axis on the craft, a directional gyroscope also rotatable about a normally vertical axis on the craft, signal means responsive to any change in the relative positions of said transmitting station, loop and gyroscope, and automatic means controlled jointly therefrom and from any change in the heading of the craft for steering the craft through said gyro pilot in a drift corrected straight line movement toward the transmitter to which said receiver is tuned.

24. In a system for guiding aircraft toward a radio transmitting station and for bringing the craft down upon a landing field, said station having a radio landing beam, the combination with azimuth and elevation control means on the craft and servo motor means for actuating the same, an automatic pilot means for controlling said servo motor means to maintain the craft on any predetermined course and for maintaining the craft in level flight, directional radio responsive means on the craft for correcting the heading set by said pilot means to maintain the course toward the transmitting station, and additional radio means responsive to the direction of the landing beam in a vertical plane for automatically altering the control from said pilot means to cause descent at the landing field.

25. A radio homing automatic steering gear for aircraft for use with broadcasting transmitter comprising directional gyroscopic means, means controlled thereby for maintaining a uniform heading, a radio compass loop adapted to be tuned to such transmitter, means controlled by the output of said loop for altering the relation between the gyroscopic means and craft to alter the heading to maintain the craft on a fixed ground course toward said transmitter, and means for turning said loop on the craft upon any change in heading of the craft to maintain the loop fixed in azimuth whereby side drift is prevented.

26. Apparatus adapted for use on a navigable vehicle comprising an energy collecting means having a normal angular relation to a source of radiated energy and to the longitudinal axis of the vehicle, means for automatically keeping the vehicle upon a predetermined heading, means for producing an impulse in response to the energy collected by said collecting means, means for adjusting said heading in response to said impulse whereby said normal angular relation is maintained, and means operable independently of the energy collected by said collecting means and responsive to deviations of the vehicle from said predetermined heading for angularly displacing said collecting means from its normal relationship to the longitudinal axis of the vehicle.

27. A system for the automatic blind landing of aircraft through use of a radio transmitting station projecting two beams which are respectively directional in azimuth and elevation, the combination with azimuth and elevation control means of the craft and servo motor means for actuating each of the same, dual receiver means, one responsive to the electromagnetic signals of the azimuth beam and the other to the elevation beam of the radio station and connected respectively to said azimuth and elevation control means to control the flight of the aircraft in azimuth and in elevation to maintain the flight path of the craft toward and down adjacent the radio transmitting station, thereby effecting automatic landing of the aircraft.

BERT G. CARLSON.